Patented Apr. 1, 1941

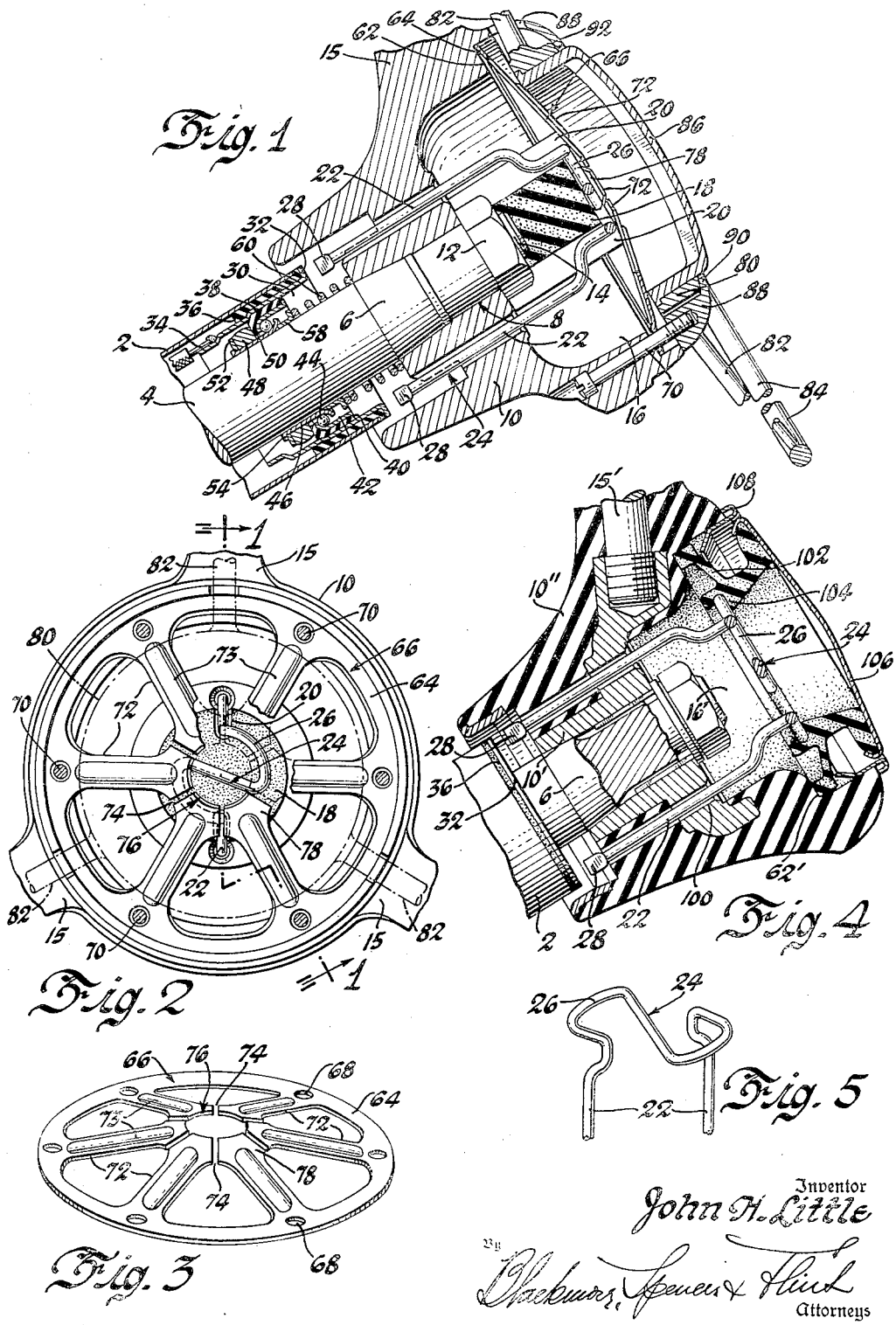

2,237,055

UNITED STATES PATENT OFFICE 2,237,055

HORN RING

John H. Little, Detroit, Mich., assignor to General Motors Corporation, Detroit, Mich., a corporation of Delaware Application December 27, 1938, Serial No. 247,821

7 Claims. (Cl. 200—59)

This invention relates to a horn ring applied to the steering wheel of an automotive vehicle and is used to sound the usual horn.

The use of a ring on the steering wheel to sound the horn has recently been placed in production on several makes of automobiles, while many manufacturers adhere to the conventional depressible button at the center of the wheel. Some of the purchasers of vehicles having the depressible button prefer the ring which extends away from the wheel hub and which may be depressed without necessitating the operator's removing his hand from the steering wheel.

The object of the present invention is to devise a horn ring capable of installation on a steering wheel and which steering wheel may be placed on the steering column as a substitute for the conventional wheel having the central depressible horn button.

The essential features of the invention are the horn ring which depresses a plurality of spring fingers or levers, the levers in turn depressing a contact which completes the circuit through the horn. The spring fingers or levers are mounted in the hub of the steering wheel and have an outer ring to connect them together, while the inner ends are free and independent of each other. The spring fingers are operated by a ring placed thereover and to which the usual horn ring is attached.

On the drawing

Figure 1 shows a sectional view through a steering wheel with the invention applied and taken on the line 1—1 of Figure 2, the steering wheel being shown in the position in which it usually appears on an automotive vehicle.

Figure 2 is a plan view of the structure of Figure 1 with the sound ring and cap removed, parts being broken away better to illustrate the invention.

Figure 3 is a perspective view of the ring having the spring fingers or levers.

Figure 4 is a sectional view similar to Figure 1 through the conventional type of steering wheel.

Figure 5 is a perspective view of the contact hairpin to make the horn circuit.

Referring to the drawing, the numeral 2 indicates the steering mast of an automotive vehicle. The mast is hollow and has the steering shaft 4 at the interior thereof. This steering shaft has the tapered and shaped end 6 over which there is received the correspondingly shaped opening 8 in the hub 10 of the steering wheel. The hub 10 is held in place by means of the nut 12 screwed onto the threaded end 14 of the steering shaft 4.

The hub 10 has a plurality of spokes 15 radiating therefrom which extend outwardly and are secured to the usual steering wheel in a well known manner.

The hub 10 is hollow as indicated at 16 and in the hollow part there is received the nut 12 and a rubber block 18. The rubber block 18 is positioned over the nut and has the lateral slots 20 to receive the shanks 22 of the contact maker or hairpin indicated as a whole at 24 and shown in detail in Figure 5. The shanks 22 are connected by the shaped head 26 and the lower extremities of the shanks 22 are provided with the feet 28 which are adapted to contact with the sleeve 30 to make the circuit through the usual horn. The sleeve 30 has a flange 32 with which the feet 28 directly contact while the sleeve portion thereof extends into the interior of the mast 2 and has the wire or lead 34 connected to the bottom thereof. This lead is a part of a circuit including a source of current and the usual automobile horn. A rubber cylinder 36 spaces the sleeve 30 and the flange 32 from the mast 2. The sleeve 30 has a shoulder 38 intermediate the length thereof and a second rubber cylinder 40 is positioned on this shoulder and supports one race 42 of a ball bearing, the balls of which are indicated at 44. The second race 46 is positioned against the steering shaft 4 and both races are turned over onto the balls to hold the balls in place. A spacer or washer 48 is positioned between a foot 50 on the end of the rubber cylinder 40 and is supported on the washer 52 which in turn rests on an outturned flange 54 on the bottom of the race 46. A ring 58 surrounds the steering shaft 4 over the race 46 and a coil spring 60 surrounding the shaft 4 and presses on the outturned flange on the end of the ring 58 and against the underside of the hub 10.

The hub 10 is provided with a shoulder 62 on which there rests the ring part 64 of the sounder ring indicated as a whole at 66 and shown in detail in Figure 3. This ring has a plurality of openings 68 for the purpose of receiving the bolts 70 and a plurality of spring fingers or levers 72 which extend inwardly from the ring but are not connected at their inner ends. Each finger or lever 72 has a raised rib 73. The fingers are spaced from each other as indicated by the spacing at 74 and the ends extend short of the center and terminate at the circle indicated by the numeral 76. The ends of the spring fingers or levers 72 are preferably enlarged or widened as indicated at 78 and these enlarged or widened ends 78 extend over the rubber block 18 and are in contact with the shaped head 26 of the contact maker or hairpin 24. As is best seen from Figures 1 and 3, the fingers of the sounder ring are positioned in conical outline with the inner ends of the fingers running toward the apex of the cone.

Over the sounder ring 66 there is positioned the lower edge of the horn button 86 and the operating ring 80 is positioned over a flange on the horn button, the button being positioned over the outer ends of the levers or spring fingers 72 and on the ribs 73 as shown in Figure 1. The operating ring 80 has the arms 82 which extend outwardly beyond the hub and terminate in the ring 84 which the operator depresses to force the operating ring 80 downward against the horn button 86 and the levers 72 to cause the inner ends 78 to press downward against the shaped head 26 of the contact member 24 and compress the rubber block 18 and force the feet 28 against the flange 32 to complete the circuit through the horn and sound the horn.

The central part of the steering wheel is provided with the depressible horn button 86 and this horn button, the operating ring and the sounder ring are held together by the retaining member 88, into which the upper ends of the bolts 70 pass. The retaining member 88 has the edge flange 90 which fits over the inner edge of the operating ring 80. The retainer member 88 is recessed at suitable intervals to allow the arms 82 of the ring to extend out beyond the hub 10.

One of the features of the invention is the increased leverage which is obtained by the use of the spring fingers or levers 72. By referring to Figure 1, it will be noted that when the operator depresses the ring 84 from a position at the bottom of the figure, the fulcrum for the lever will be at the upper side of the finger where the ring 80 contacts the finger 72. This will give a rather long leverage and, if the fingers 72 were not used, in some instances the amount of depression of the ring 84 would not be sufficient to force the feet 28 of the contact 24 into engagement with the flange 32. However, with the increased leverage afforded by the fingers 72, the pressure at the edge of the fingers 72 by the ring 80 easily will depress the contact member 24 a sufficient distance to assure the engagement of the feet 28 with the flange 32.

Referring to Figure 4, the steering mast 2 is shown as provided with the conventional steering wheel which has no horn ring. The hub is indicated at 10' and is of metal, while the secondary hub part 10" surrounds the main hub part 10' and forms a part thereof. The part 10" is preferably made of hard rubber. The steering wheel spokes 15' are screw-threaded into threaded sockets in the hub 10' and extend outwardly to the periphery of the steering wheel. The hub 10' has the openings 100 for the reception of the shanks 22 of the contact member 24 which is of the same shape as shown in Figure 5. The hub has the usual recess 16' and this recess is provided with a shoulder 62' at its upper part and on this shoulder there is received the rubber retainer member 102 the bottom of which is suitably shaped as shown at 104 to receive the head 26 of the contact member 24. The rubber retainer member 102 has the metal cap 106 thereover and a metal ring 108 is fitted and secured into the recess 16' at the outer extremity thereof and surrounds the metal cap 106. By depressing the cap 106 the rubber 102 will yield and allow the hairpin or contact member 24 to strike against the flange 32 to sound the horn button. This structure is conventional and it is over this structure that the improvement in Figure 1 relates.

I claim:

1. In a horn sounding device applied to the steering wheel of an automotive vehicle, said wheel having a hub, a shoulder in the hub, a sounder ring positioned on the shoulder, a plurality of inwardly extending spring fingers on the ring, an electric contact mounted in the hub and under the fingers and adapted to be moved when the fingers are depressed, a second contact engageable by the first contact, a horn button positioned on the fingers, and an operating ring positioned on the horn button and extending outwardly beyond the hub, said operating ring capable of being depressed to depress the fingers to cause the fingers to move the movable contact to engage with the other contact to close an electric circuit to cause the horn to sound, said horn button adapted to be operated independently of the operating ring to sound the horn by depressing the sounder ring.

2. In a horn sounding device applied to the steering wheel of an automotive vehicle, said wheel having a hub, a shoulder in the hub, a sounder ring positioned on the shoulder, a plurality of inwardly extending spring fingers on the ring, an electric contact mounted in the hub and under the fingers and adapted to be moved when the fingers are depressed, a second contact engageable by the first contact, a horn button positioned on the fingers, and an operating ring positioned on the horn button and extending outwardly beyond the hub, said horn button contacting the fingers adjacent their outer extremities and capable of being depressed by the operating ring to depress the inner extremities of the fingers to cause the fingers to cause the horn to sound, said horn button adapted to be operated independently of said operating ring to sound the horn by depressing the sounder ring.

3. In a horn sounding device applied to the steering wheel of an automotive vehicle, said wheel having a hub, means in the hub movably to support an electric contact, a second contact engageable by the first contact, a plurality of radial spring fingers supported in the hub over the first contact, an operating ring mounted in the hub and supported over the fingers near the outer ends thereof, means to hold the operating ring in position, the operating ring having arms extending outwardly of the hub to enable the ring to be operated from the steering wheel, the operation of said arms causing the operating ring to depress the spring fingers to cause the fingers to move the first contact to close the circuit to sound the horn.

4. In a horn sounding device applied to the steering wheel of an automotive vehicle, said wheel having a hub, a soft rubber element mounted in the hub, an electric contact mounted on said rubber element, a second contact engageable by the first contact, a plurality of levers mounted in the hub and having one of their ends over the first contact, an operating member mounted in the hub and positioned over the other ends of the levers, said operating member projecting outside the hub and having means at its ends to enable it to be operated by the driver of the vehicle, the operation of said member causing the movement of the levers to cause the first contact to be moved into circuit closing position to cause the horn to be sounded.

5. In a horn sounding device applied to the steering wheel of an automotive vehicle, said wheel having a hub, a soft rubber element mounted in the hub, an electric contact mounted on said rubber element, a second contact engageable by the first contact, a plurality of levers mounted in the hub and having one of their ends over the first contact, an operating member mounted in the hub and positioned over the other ends of the levers, said operating member projecting outside the hub and having means at its ends to enable it to be operated by the driver of the vehicle, the operation of said member causing the movement of the levers to cause the first contact to be moved into circuit closing position to cause the horn to be sounded, and depressible means mounted centrally of the hub and capable of moving the levers and first contact to complete the circuit and sound the horn.

6. In a horn sounding device applied to the steering wheel of an automotive vehicle, said wheel having a hub, a plurality of levers mounted in the hub, said levers being interconnected at one end and disconnected at the other, a contact mounted in the hub, the contact being directly under and engageable by the inner end of the levers, a second contact engageable by the first contact, an operating member mounted in the hub and positioned over the outer ends of the levers, said member having arms extending away from the hub to enable the operator of the vehicle to depress the member to cause the levers to be actuated to move the first contact to make a circuit to sound the horn.

7. In a horn sounding device applied to the steering wheel of an automotive vehicle, said wheel having a hub, a plurality of levers mounted in the hub, a contact mounted in the hub, the contact being directly under and engageable by one end of the levers, a second contact engageable by the first contact, an operating member mounted in the hub and positioned over the other ends of the levers, said member having arms extending away from the hub to enable the operator of the vehicle to depress the member to cause the levers to be actuated to move the first contact to make a circuit to sound the horn, and a horn sounder button mounted in said operating member and movable independently thereof and capable of operating the levers to sound the horn.

JOHN H. LITTLE.